United States Patent Office 3,424,031
Patented Jan. 28, 1969

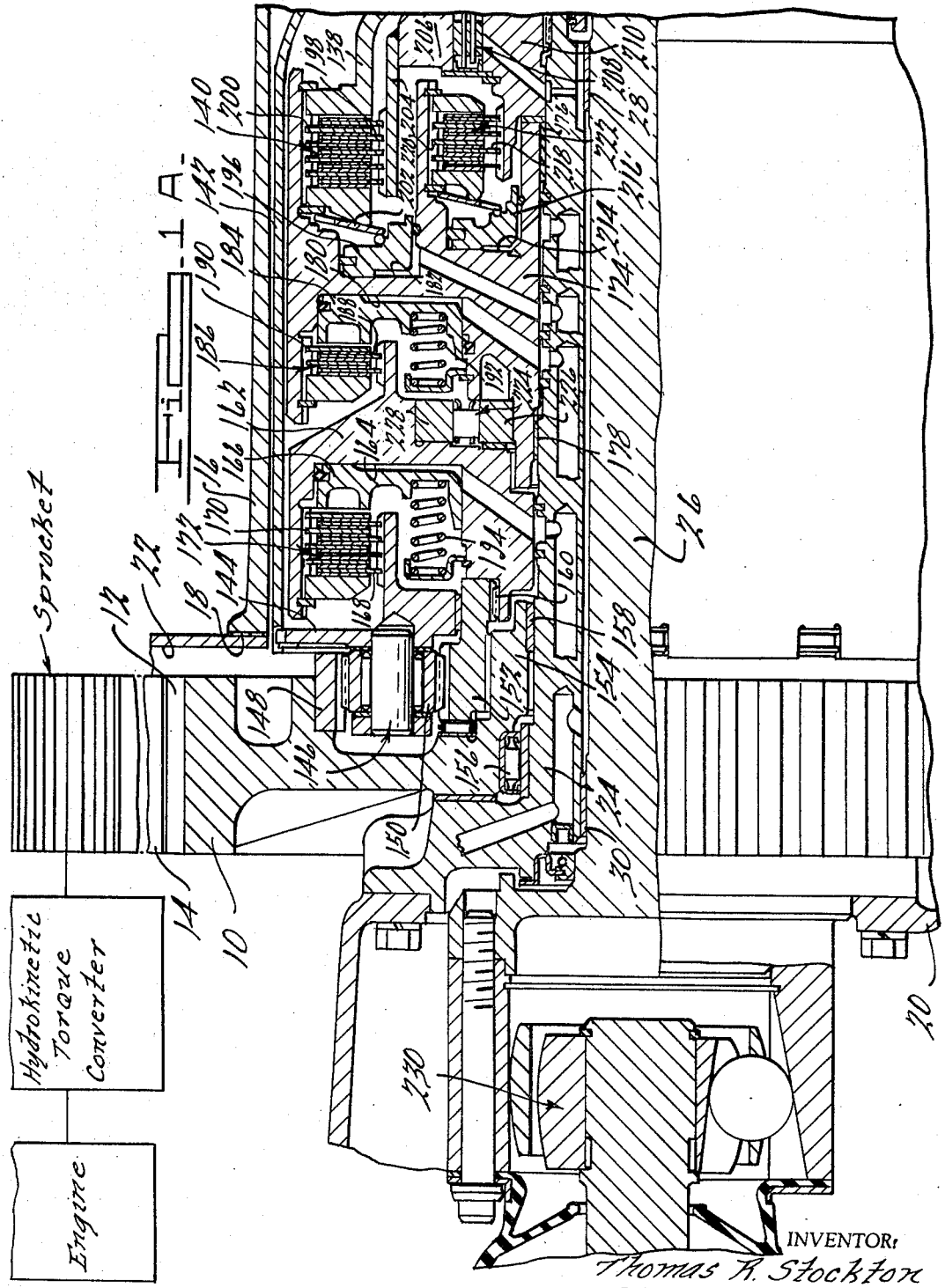

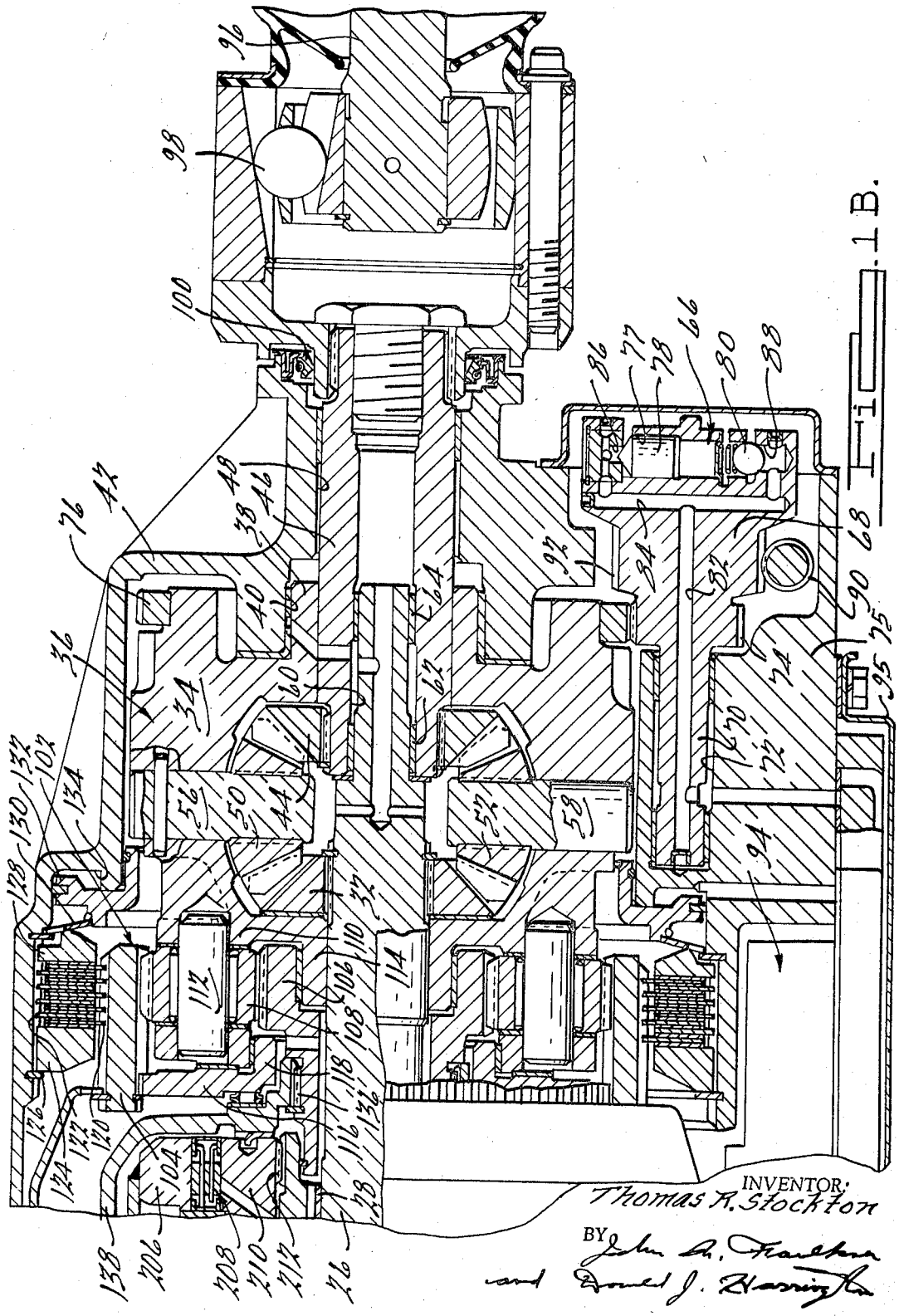

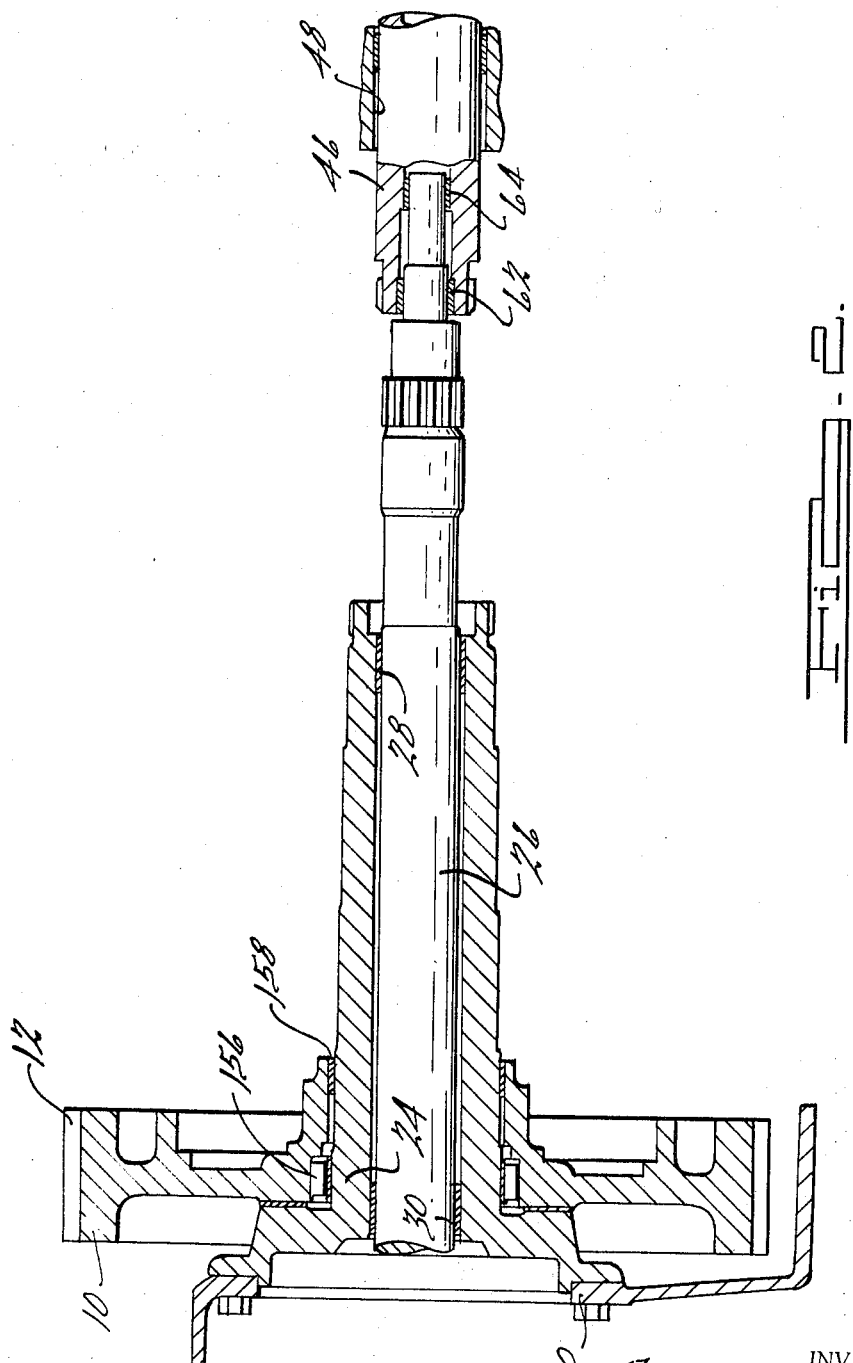

3,424,031
MULTIPLE SPEED RATIO POWER TRANSMISSION MECHANISM WITH A MINIMUM DEFLECTION CHAIN DRIVE
Thomas R. Stockton, Ann Arbor, Mich., assignor to Ford Motor Company, Dearborn, Mich., a corporation of Delaware
Filed July 5, 1967, Ser. No. 651,318
U.S. Cl. 74—695        8 Claims
Int. Cl. F16h *37/08*

ABSTRACT OF THE DISCLOSURE

This specification describes a driveline arrangement for a wheeled vehicle having an internal combustion engine with its crankshaft situated in spaced relationship with respect to the axis of the axle shafts for the traction wheels. The driveline includes a hydrokinetic torque converter situated for rotation about the axis of the crankshaft and a planetary gear arrangement with its axis situated concentrically with respect to the axis of the output shafts. The turbine of the converter and the power input gear element of the planetary gearing are connected by means of a chain and sprocket drive so that torque can be distributed from one axis to the other. The power input sprocket element for the planetary gear arrangement is mounted rotatably on a cantilever sleeve shaft. The extended end of the sleeve shaft pilots one of the two output shafts, which are end supported with the bearing loads thereon distributed to each of the axially displaced walls of the casing for the planetary gearing. The sleeve shaft serves also as a torque reaction shaft for accommodating reaction torque of the gearing during torque delivery.

Brief description of the invention

My invention comprises an automotive vehicle power transmission mechanism having a chain and sprocket drive connection between a first sprocket wheel mounted for rotation about the engine crankshaft axis and a second sprocket wheel mounted for rotation about the output shaft axis. The two axes are situated in parallel, spaced disposition. The second sprocket forms a power input drive element for planetary gear elements, the output element of which serves as a power input member for a differential gear unit. The differential side gears for the differential gear unit are connected drivably to the axle shafts, one of which extends concentrically through the planetary gearing and a relatively long bearing support sleeve, which is connected at one end thereof to a side wall on the transmission casing for the planetary gear element.

The second sprocket is rotatably journaled on this sleeve directly adjacent the supporting side wall. The free end of the sleeve is supported by the cooperating output shaft, the inboard end of the latter being supported by another wall of the transmission casing. This construction eliminates the necessity for providing an intermediate supporting wall or center support for accommodating the forces acting on the gearing element.

Notwithstanding the lack of a center support in the gearing, deflections due to loading of the drive chain are avoided. The torque distributed through the gearing travels through any one of several forward driving torque delivery paths depending upon the sequence in the application and release of friction torque establishing devices. The torque reaction of the planetary gearing during operation in underdrive ratios is transmitted torsionally through the sleeve shaft to the casing.

Brief description of the figures of the drawings

FIGURES 1A and 1B show in longitudinal cross-sectional form a planetary gearing arrangement for use in a driveline of the type above described.

FIGURE 2 shows a sub-assembly of the driven sprocket and the supporting sleeve shaft.

Particular description of the invention

In FIGURE 1A numeral 10 designates a sprocket for a chain drive. It is formed with external teeth 12 which mesh with a drive chain shown in schematic fashion at 14.

The transmission casing is identified by reference character 16. It is formed with a shoulder 18 at its left-hand margin. Bolted or otherwise secured to the shoulder 18 is a sprocket and chain cover 20. This cover is formed with an opening at its upper end, as shown generally at 22, to permit the chain 14 to be trained around the sprocket 10. The chain extends to another sprocket which is driven by the turbine of the hydrokinetic torque converter, not shown. The impeller of the hydrokinetic torque converter is coupled drivably to the crankshaft of an internal combustion engine, not shown.

The left-hand wall of the cover 20 has formed integrally therewith a support sleeve 24 which extends in a right-hand direction for a considerable length into the housing 16. A first power output shaft 26 is journaled at spaced locations within the sleeve 24. Spaced bushings 28 and 30 between the shaft 26 and the sleeve 24 are provided for this purpose. The shaft 26 is connected drivably to differential side gear 32 of the differential gear unit 34. The carrier 36 of the gear unit 34 is rotatably journaled at its hub 38 within the bearing opening 40 formed in the housing end wall 42 for the housing 16. A second differential side gear 44 situated within carrier 34 is splined to a second power output shaft 46. This shaft is journaled within a bearing sleeve extension 48 formed on the wall 42.

The interior of the carrier 34 encloses also a pair of differential pinions 50 and 52. Pinion 50 is rotatably supported by pinion shaft 56 and pinion 52 is supported by corresponding pinion shaft 58. The right-hand end of the shaft 26 is formed with a reduced diameter and is received within a bearing opening 60 formed in the end of shaft 46. It is journaled therein by bushings 62 and 64. In this way the wall 42 serves as an end support for the shaft 26.

A fluid pressure governor assembly 66 is situated at the lower end of the differential structure shown in FIGURE 1B. It includes a valve body 68. The body 68 is formed with a mounting stem 70 which is journaled rotatably within a bearing opening 72 formed in a boss 75 which forms a part of the lower region of the housing 16. A drive gear 74 formed on the housing 68 meshes with a drive gear 76 carried by the differential carrier 36. The governor 66 thus is driven at a speed that is related directly to the speed of carrier 34.

Any of a variety of governor constructions could be used, but in the particular embodiment of FIGURES 1A and 1B the governor 66 comprises an internal valve chamber 77 in which a centrifugal valve element 78 is slidably mounted. The chamber contains also a valve element 80. A governor feed passage 82 extending through the body 68 communicates with radial passages 84, which communicate at the radially outward extremity thereof with valve orifice 86 and a relatively large valve orifice 88. The valve chamber 77 communicates with the exhaust region.

The degree of communication between passage 82 and valve chamber 77 is dependent upon the speed of rotation of the body 70 since the valves 78 and 80 progressively restrict their respective orifices to a degree that is dependent upon the centrifugal force acting on them which in turn is proportional to the speed of rotation.

As the valve element 78 restricts its orifice upon an increase in the speed of rotation of the body 68, the back pressure in passage 82 is increased. This back pressure is used as an indicator of vehicle speed by the control valve system, not shown. When a predetermined pressure build-up occurs, the pressure force acting on valve element 80 overcomes the opposing centrifugal force to introduce a second orifice. Thus the relationship of speed to pressure build-up in passage 82 is changed at higher speeds since both valve elements then are active. The governor pressure signal then is more sensitive to speed changes in the low speed range than in the high speed range.

A speedometer gear 90 may be drivably engaged with a gear 92 formed on the valve body 68.

The control valve system for the transmission mechanism is illustrated in diagrammatic form at 94. It is situated in a transmission sump that is defined in part by oil pan 95.

The right-hand end of shaft 46 is connected to an axle shaft 96 by a universal joint 98. A running seal 100 between the universal joint yoke and the housing wall 42 prevents loss of lubricant at that point.

A simple planetary gear unit 102 is situated directly adjacent the differential gear unit 36. It includes a ring gear 104, a sun gear 106, planet pinions 108 and a planetary carrier 110. The carrier includes pinion shafts 112 which rotatably journal pinions 108. The carrier is supported at its hub 114 on the shaft 26. The ring gear is supported by a spacer 116 having a hub 118 journaled within the carrier 110. Pinions 112 mesh with ring gear 104 and sun gear 106. Gear 104 is extrnally splined to permit a driving connection with internally splined brake discs 120 which are situated in inter-digital relationship with respect to externally splined friction plates 122. A reaction ring 124 is situated directly adjacent the assembly of discs 120. A snap ring 126 holds the ring 124 axially fast. A pressure ring 128 is engaged by Belleville spring 130, the outer periphery of which is anchored to the housing 16. The inner periphery of the washer 130 is engaged by annular piston 132 which cooperates with the housing 16 to define an annular pressure chamber 134.

Sun gear 106 is journaled on the hub 114 of carrier 110. It is splined at 136 to friction clutch member 138 for a forward drive multiple disc clutch assembly 140. Ring gear 104 is splined directly to drive shell 142 which encircles the various clutches and brakes for the gearing. Its left-hand end is connected drivably to carrier 144 for a second simple planetary gear unit 146. This gear unit includes a ring gear 148 connected directly to sprocket wheel 10. It includes also pinions 150 which are journaled on the carrier 144. Pinions 150 mesh with ring gear 148 and with a sun gear 152 which in turn is supported by a bushing on the hub 154 of the sprocket wheel 10.

The main bearing support for the sprocket wheel 10 is provided by a needle bearing 156. Auxiliary support is provided by bushing 158 at the right-hand end of the hub 154. Sun gear 152 is splined at 160 to clutch drum 162. This drum defines an annular cylinder 164 which receives an annular piston 166. When fluid pressure is admitted to the pressure chamber defined in part by the piston 166, friction clutch discs 168 carried by carrier 144 and clutch plates 170 carried by the drum 162 become engaged frictionally. This establishes a driving connection between the carrier 144 and the clutch drum 162. The clutch, which is identified by reference character 172, is engaged during operation in the second speed ratio and the third or high speed ratio.

A second compound clutch drum 174 also is journaled rotatably on the sleeve 24, spaced bushings 176 and 178 being provided for this purpose. Clutch drum 174 defines an annular cylinder 180 and a smaller annular cylinder 182. Annular piston 184 is situated in the cylinder 180. When fluid pressure is admitted to the chamber defined in part by the piston 184, the associated clutch shown generally at 186 becomes frictionally applied. This clutch includes clutch discs 188 carried by the drum 162 and clutch plates 190 carried by the drum 174. Thus, when the clutch 186 is applied, the two drums 162 and 174 are connected drivably. Clutch 186 is engaged during reverse drive operation, during high speed ratio operation and during hill-braking in the first driving speed ratio.

Clutch piston return springs 192 and 194 engage respectively the pistons 184 and 166 to return them to their disengaged positions. When the actuating fluid pressure is exhausted, the cylinder 182 forms a part of the clutch 140 previously described. The clutch includes an annular piston 196 which cooperates with the cylinder 182 to define a pressure chamber. Forces applied to the piston 196 are transmitted to the clutch discs 198 and the clutch plates 200 through a Belleville spring 202. The drum 174 is connected directly to the sun gear 106 through the clutch member 138.

The discs 198 are carried by clutch member 204 which is connected directly to overrunning brake outer race 206. The inner race for the overrunning brake, which is identified generally by reference character 208, is shown at 210. It is splined directly to the end of the sleeve 24 shown at 212.

Clutch drum 174 includes also an annular cylinder 214 which receives an annular piston 216. When fluid pressure is admitted behind the piston 216, clutch discs 218 carried by the race 210 and clutch plates 220 carried by the clutch drum 174 are brought into frictional engagement thereby connecting directly the drum 174 to the inner race 210. The assembly shown in part at 218 and 220 is identified generally by reference character 222. (For purposes of accuracy in nomenclature, the structure 222 hereafter will be referred to as a brake rather than a clutch.) It is engaged during hillbraking operation in the first speed ratio and in the second speed ratio.

Clutch 140 is disengaged, however, during reverse drive operation.

To establish forward drive low speed ratio operation as the vehicle is accelerated from a standing start, clutch 140 is applied. This connects the sun gear 106 to the overrunning brake outer race 206. Overrunning brake 208 thus can accommodate the reaction torque of the sun gear 106.

The torque of the sprocket wheel 10 is distributed to the ring gear 148. Sun gear 152 is anchored since it is connected directly to the stationary sleeve 24 through spline connection 160 and through clutch drum 162, and through a second overrunning brake 224 to the clutch drum 174. Overrunning brake 224 includes an inner race 226 connected directly to clutch drum 174 and an outer race 228 connected directly to the clutch drum 162. Clutch drum 174 is connected to the anchored inner race 210 through engaged friction brake 222. The carrier torque on carrier 144 is distributed through the drive shell 142 to the ring gear 104 with sun gear 106 acting as a reaction member. Carrier 110 and the differential carrier 34 are driven with a reduced relative speed. The torque applied to the carrier 34 is distributed to each of the side gears 44 and 32 and to each of the output shafts 46 and 26. The left-hand end of the shaft 26 is connected to one of the axle shafts through a universal joint 230, which corresponds to the universal joint 98 for the shaft 46.

To effect an automatic ratio change in the intermediate speed ratio, clutch 140 remains applied and clutch 172 is applied. This locks together the elements of the planetary gear unit 146. The ring gear 104 now is driven as torque is distributed to it through the same torque delivery path, although the speed is increased because of the locked-up condition of the gear unit 146. The overrunning brake 224 freewheels under these conditions although overrunning brake 208 continues to deliver reaction torque to the sleeve shaft 24.

To effect a ratio change from the intermediate speed ratio to the high speed ratio, it merely is necessary to apply clutch 186 as clutches 172 and 140 remain applied. The planetary gear units now are locked up for rotation in unison so that a 1:1 drive ratio is established between sprocket 10 and shafts 26 and 46.

Reverse drive is achieved by engaging clutch 186, disengaging clutches 172 and 140 and engaging the disc brake shown in part at 122. Ring gear 104 now becomes anchored by its associated brake. The carrier 144 also is anchored since it is connected to the stationary ring gear through the drive shell 142. The torque on the ring gear 148 then tends to drive the sun gear 152 in a reverse direction. This reverse motion is transmitted through the clutch drum 162 and through the engaged clutch 186 to the sun gear 106. The reverse torque on the sun gear 106 is multiplied by the gear unit 102 so that the carrier is driven at a reduced speed ratio in the reverse direction.

Hill brake operation in the first and second speed ratios is achieved by bypassing the overrunning brake 208 by the friction brake 122. This brake is capable of accommodating torque reaction in either direction thereby complementing the one-way braking action of the brake 208. To achieve hill braking operation in the first speed ratio it is necessary further to engage friction clutch 186 since the reverse torque applied to the sun gear 102 under these conditions cannot be accommodated by the overrunning clutch 224.

The sleeve 24 acts as a torsional reaction member during operation in low speed ratio and intermediate speed ratio as well as during hill braking operation in the first and second speed ratios. It acts also as a bearing support for the sprocket wheel 10, and it is characterized by a minimum deflection due to the reaction loads. This minimum deflection condition is achieved without the need for providing an intermediate or center support wall in the housing. The loads on the sleeve 24 are relatively small because of the geometry of the sleeve. These reduced loads are transmitted to the output shaft 26 through the sleeve shaft bearings and the output shaft in turn is end supported by the end walls.

Having thus described a preferred form of my invention, what I claim and desire to secure by U.S. Letters Patent is:

1. In a driveline adapted to deliver driving torque from a rotary drive member to a driven member mounted for rotation about an axis that coincides with the axis of said driving member, a transmission housing, planetary gear units in said housing adapted to deliver driving torque through plural torque delivery paths from said driving member to said driven shaft, clutch and brake means for controlling the relative motion of elements of said gear units, a stationary sleeve shaft connected to said housing and extending over said driven shaft, said driven shaft being journaled for rotation within said sleeve shaft, said power input member being journaled rotatably on said sleeve shaft at a position adjacent said housing, auxiliary bearing means between said shafts and spaced axially from said input member, and reaction brake means for distributing reaction torque from said planetary gear unit to said sleeve shaft.

2. The combination as set forth in claim 1 wherein said planetary gear units include a differential carrier, differential side gears in said carrier, planet pinions in said carrier meshing with said side gears and carried by said carrier, a second driven shaft drivably connected to one side gear, said first-named driven shaft being connected to the other side gear, said second driven shaft being journaled rotatably in said housing and said first-named driven shaft being journaled on said second driven shaft.

3. The combination as set forth in claim 1 wherein said planetary gear units comprise a first simple planetary gear unit and a second simple planetary gear unit, each gear unit comprising a ring gear, a sun gear, planet pinions engaging said sun and ring gears and a planet carrier rotatably journaling said pinions, said power input member being connected to the ring gear of a first of said gear units, the carrier of said first gear unit being connected to the ring gear of the second of said gear units, the carrier of said second gear unit forming a power output element of said paired planetary gear units, brake means for anchoring the sun gear of said first gear unit to provide torque reaction, and other brake means for anchoring the sun gear of said second gear unit to provide torque reaction, each brake means having a portion thereof in common, said common portion being connected to said sleeve shaft.

4. The combination as set forth in claim 2 wherein said planetary gear units comprise a first simple planetary gear unit and a second simple planetary gear unit, each gear unit comprising a ring gear, a sun gear, planet pinions engaging said sun and ring gears and a planet carrier rotatably journaling said pinions, said power input member being connected to the ring gear of a first of said gear units, the carrier of said first gear unit being connected to the ring gear of the second of said gear units, the carrier of said second gear unit forming a power output element of said paired planetary gear units, brake means for anchoring the sun gear of said first gear unit to provide torque reaction, and other brake means for anchoring the sun gear of said second gear unit to provide torque reaction, each brake means having a portion thereof in common, said common portion being connected to said sleeve shaft.

5. The combination as set forth in claim 3 wherein the sun gear of the first gear unit is connected to a first rotary clutch member, the sun gear of said second gear unit being connected directly to a second rotary clutch member, an overrunning coupling means for drivably connecting said clutch members to accommodate torque distribution therebetween in one direction, an overrunning brake having a pair of brake races, one race being connected to said sleeve shaft and selectively engageable friction brake means for connecting the other race thereof to the sun gear of said second gear unit.

6. The combination as set forth in claim 4 wherein the sun gear of the first gear unit is connected to a first rotary clutch member, the sun gear of said second gear unit being connected directly to a second rotary clutch member, an overrunning coupling means for drivably connecting said clutch members to accommodate torque distribution therebetween in one direction, an overrunning brake having a pair of brake races, one race being connected to said sleeve shaft and selectively engageable friction brake means for connecting the other race thereof to the sun gear of said second gear unit.

7. The combination as set forth in claim 5 including a separate friction clutch means carried by each clutch member with friction elements thereof arranged in parallel disposition with respect to said overrunning coupling means and said overrunning brake, respectively, whereby said overrunning coupling means and brake may be bypassed to accommodate reaction torque distribution in either direction.

8. The combination as set forth in claim 6 including separate friction clutch means carried by each clutch member with friction elements thereof arranged in parallel disposition with respect to said overrunning coupling means and said overrunning brake respectively whereby said overrunning coupling means and brake may be bypassed to accommodate reaction torque distribution in either direction.

References Cited
UNITED STATES PATENTS

| | | | |
|---|---|---|---|
| 1,623,724 | 4/1927 | Harry | 74—695 X |
| 2,225,720 | 12/1940 | Snow | 74—695 |
| 3,029,662 | 4/1962 | Hause | 74—695 |

DONLEY J. STOCKING, *Primary Examiner.*

THOMAS C. PERRY, *Assistant Examiner.*

U.S. Cl. X.R.

74—606, 759